US008868220B2

(12) United States Patent
Crucs

(10) Patent No.: US 8,868,220 B2
(45) Date of Patent: Oct. 21, 2014

(54) SYSTEMS AND METHODS FOR AUTOMATICALLY CHANGING OPERATIONAL STATES OF APPLIANCES

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 789 days.

(21) Appl. No.: 13/089,412

(22) Filed: Apr. 19, 2011

(65) Prior Publication Data

US 2011/0218650 A1    Sep. 8, 2011

Related U.S. Application Data

(63) Continuation-in-part of application No. 11/778,129, filed on Jul. 16, 2007.

(51) Int. Cl.
*G06F 19/00* (2011.01)
*G05B 11/01* (2006.01)

(52) U.S. Cl.
CPC ...................................... *G05B 11/01* (2013.01)
USPC .................................. 700/19; 455/353; 62/93

(58) Field of Classification Search
USPC ............... 700/19, 278, 9, 67; 455/353, 456.3, 455/420, 404.2, 419, 456.5; 340/539.22, 340/909, 929; 709/223; 701/1
See application file for complete search history.

(56) References Cited

U.S. PATENT DOCUMENTS

| | | | |
|---|---|---|---|
| 4,633,407 A | 12/1986 | Freienstein et al. | |
| 5,218,367 A | 6/1993 | Sheffer et al. | |
| 5,223,844 A | 6/1993 | Mansell et al. | |
| 5,602,739 A | 2/1997 | Haagenstad et al. | |
| 5,617,086 A | 4/1997 | Klashinsky et al. | |
| 5,673,305 A | 9/1997 | Ross | |
| 5,781,108 A * | 7/1998 | Jacob et al. | ............. 340/552 |
| 5,878,367 A | 3/1999 | Lee et al. | |
| 5,961,571 A | 10/1999 | Gorr et al. | |
| 5,969,641 A | 10/1999 | Nakamura et al. | |
| 6,098,048 A | 8/2000 | Dashefsky et al. | |
| 6,148,262 A * | 11/2000 | Fry | ............. 701/454 |
| 6,240,365 B1 | 5/2001 | Bunn | |
| 6,345,228 B1 | 2/2002 | Lees | |
| 6,363,323 B1 | 3/2002 | Jones | |
| 6,392,565 B1 | 5/2002 | Brown | |
| 6,480,783 B1 | 11/2002 | Myr | |
| 6,512,465 B2 | 1/2003 | Flick | |
| 6,606,562 B1 | 8/2003 | Gifford | |

(Continued)

OTHER PUBLICATIONS

Kim et al., Home Appliance Control System, Oataber 12, 2006, p. 1-16.*

(Continued)

*Primary Examiner* — Kidest Bahta
(74) *Attorney, Agent, or Firm* — Hahn Loeser & Parks LLP; Brendan E. Clark

(57) ABSTRACT

Systems and methods for automatically changing an operational state of an appliance associated with a known fixed location. A current location of an individual is automatically determined with respect to a known fixed location using at least one wireless communication device. The system automatically determines if an operational state of at least one appliance associated with the known fixed location is to be changed based on at least the current location of the individual. The operational state of the at least one appliance is automatically changed if it is determined that the operational state is to be changed.

40 Claims, 9 Drawing Sheets

(56) References Cited

U.S. PATENT DOCUMENTS

| | | | |
|---|---|---|---|
| 6,631,322 | B1 | 10/2003 | Arthur et al. |
| 6,737,989 | B2 | 5/2004 | Flick |
| 6,756,887 | B2 | 6/2004 | Evans |
| 6,833,811 | B2 | 12/2004 | Zeitfuss et al. |
| 6,853,910 | B1 | 2/2005 | Oesterling et al. |
| 6,904,347 | B1 | 6/2005 | Berenz et al. |
| 6,908,066 | B2 | 6/2005 | Koenig |
| 6,988,026 | B2 | 1/2006 | Breed et al. |
| 7,082,359 | B2 | 7/2006 | Breed |
| 7,379,778 | B2 * | 5/2008 | Hayes et al. ............... 700/66 |
| 7,554,441 | B2 | 6/2009 | Viegers et al. |
| 7,634,226 | B2 | 12/2009 | Estevez |
| 7,750,841 | B2 | 7/2010 | Oswald et al. |
| 7,880,609 | B2 | 2/2011 | Viegers et al. |
| 7,881,733 | B2 * | 2/2011 | Staton et al. ............... 455/456.6 |
| 7,881,838 | B2 | 2/2011 | Larschan et al. |
| 8,290,515 | B2 * | 10/2012 | Staton et al. ............... 455/456.6 |
| 8,577,392 | B1 * | 11/2013 | Pai et al. ............... 455/456.3 |
| 8,594,642 | B2 * | 11/2013 | Silver et al. ............... 455/417 |
| 2001/0018639 | A1 | 8/2001 | Bunn |
| 2001/0020204 | A1 | 9/2001 | Runyon |
| 2002/0014978 | A1 | 2/2002 | Flick |
| 2002/0070862 | A1 | 6/2002 | Francis et al. |
| 2002/0090955 | A1 | 7/2002 | Nelson et al. |
| 2002/0099502 | A1 | 7/2002 | Hilleary |
| 2002/0128769 | A1 | 9/2002 | Der Ghazarian et al. |
| 2002/0147006 | A1 * | 10/2002 | Coon et al. ............... 455/420 |
| 2002/0158777 | A1 | 10/2002 | Flick |
| 2003/0016147 | A1 | 1/2003 | Evans |
| 2003/0120364 | A1 | 6/2003 | Kirsch |
| 2003/0141990 | A1 | 7/2003 | Coon |
| 2003/0146854 | A1 | 8/2003 | Jones |
| 2004/0093159 | A1 | 5/2004 | Bernesi et al. |
| 2004/0116116 | A1 | 6/2004 | Nadan |
| 2004/0230372 | A1 | 11/2004 | Chang |
| 2004/0246144 | A1 | 12/2004 | Siegel et al. |
| 2005/0026627 | A1 | 2/2005 | Boling et al. |
| 2005/0038598 | A1 | 2/2005 | Oesterling et al. |
| 2005/0071079 | A1 | 3/2005 | Godfrey et al. |
| 2005/0083211 | A1 | 4/2005 | Shafir et al. |
| 2005/0088320 | A1 | 4/2005 | Kovach |
| 2005/0174257 | A1 | 8/2005 | Shankwitz et al. |
| 2006/0099971 | A1 * | 5/2006 | Staton et al. ............... 455/456.6 |
| 2006/0180647 | A1 | 8/2006 | Hansen |
| 2006/0265123 | A1 | 11/2006 | Chon et al. |
| 2007/0005245 | A1 | 1/2007 | Ellis |
| 2007/0010260 | A1 * | 1/2007 | Zellner ............... 455/456.1 |
| 2007/0042789 | A1 * | 2/2007 | Moton et al. ............... 455/456.1 |
| 2008/0042836 | A1 | 2/2008 | Christopher |
| 2008/0068165 | A1 | 3/2008 | DeWitt et al. |
| 2008/0181172 | A1 * | 7/2008 | Angelhag et al. ............... 370/328 |
| 2008/0200182 | A1 * | 8/2008 | Shim ............... 455/456.1 |
| 2008/0243350 | A1 | 10/2008 | Harkness |
| 2009/0115638 | A1 | 5/2009 | Shankwitz et al. |
| 2010/0265104 | A1 | 10/2010 | Zlojutro |

OTHER PUBLICATIONS

Berger, Ivan; "Standards for Car Talk", IEEE, vol. 31, No. 1, Mar. 2007, pp. 1+6.

PCTUS2008070037 International Search Report dated Dec. 31, 2008.

PCTUS2008070037 Written Opinion dated Dec. 31, 2008.

* cited by examiner

SYSTEMS AND METHODS FOR AUTOMATICALLY CHANGING OPERATIONAL STATES OF APPLIANCES

This U.S. patent application claims priority to and is a continuation-in-part (CIP) patent application of pending U.S. patent application Ser. No. 11/778,129 filed on Jul. 16, 2007 which is incorporated herein by reference in its entirety.

TECHNICAL FIELD

Certain embodiments of the present invention relate to the automated activation of appliances. More particularly, certain embodiments relate to systems and methods for automatically changing an operational state of an appliance associated with a known fixed location based on a current location of an individual with respect to the known fixed location.

BACKGROUND

Today, certain appliances within, for example, a home may be programmed to activate or deactivate at certain times of the day using, for example, programmable timers or thermostats. These certain times may correspond to an estimate or likelihood of when an individual is expected to be at home or away from home on any given day. This may require an individual to frequently re-program their appliances. Furthermore, many people have chaotic and inconsistent schedules that change from day to day, making it difficult to predict when a person will be home or not on any given day. Therefore, it is desirable to have an improved way of automatically activating and de-activating appliances in the home, and/or elsewhere, in a more effective manner.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

An embodiment of the present invention comprises a method of automatically changing an operational state of an appliance associated with a known fixed location. The method includes automatically determining a current location of an individual with respect to the known fixed location using at least one wireless communication device. The method further includes automatically determining if an operational state of at least one appliance associated with the known fixed location is to be changed based on at least the current location with respect to the known fixed location. The method also includes automatically changing the operational state of the at least one appliance if the operational state is to be changed. The known fixed location may include one of a house, an apartment, a residential complex, an office building, a place of business, and an industrial park. The appliance may include at least one of a lighting device, a heating system, a cooling system, a computer device, a cooking appliance, a security system, a window covering controller, a coffee maker, a heating system of a swimming pool, a hot tub, a Jacuzzi, a fireplace, and a garage door opener. The method step of automatically changing the operational state of an appliance may include changing the operational state between one of an "ON" state and an "OFF" state, an "OPEN" state and a "CLOSED" state, an "UNBOOTED" state and a "BOOTED" state, an "ARMED" state and a "DISARMED" state, an "ACTIVATED" state and a "DE-ACTIVATED" state, "ONE PRE-PROGRAMMED" state and "ANOTHER PRE-PROGRAMMED" state, "ONE PRE-DEFINED" state and "ANOTHER PRE-DEFINED" state, a "COOKING" state and a "NON-COOKING" state, an "ENABLED" state and a "DISABLED" state. The method may further include automatically determining a current distance between the current location and the known fixed location. The operational state of the appliance may be changed when the current distance is less than a pre-defined distance or when the current distance is greater than a pre-defined distance. The method may also include determining at least one of a current time-of-day, a current day-of-the-week, and a current date. The method may further include automatically determining a remaining time-of-travel between the current location and the known fixed location based on the current location, the known fixed location, and at least one of the current time-of-day, the current day-of-the-week, and the current date. The operational state of an appliance may be changed when the remaining time-of-travel is less than a pre-defined time-of-travel or when the remaining time-of-travel is greater than a pre-defined time-of-travel. The operational state of an appliance may be changed when the current distance is less than a pre-defined distance and the current time-of-day is later than a pre-defined time-of-day. The operational state of an appliance may be changed when the current distance is greater than a pre-defined distance and the current time-of-day is later than a pre-defined time-of-day. The operational state of an appliance may be changed when the current distance is less than a pre-defined distance and the current time-of-day is earlier than a pre-defined time-of-day. The operational state of an appliance may be changed when the current distance is greater than a pre-defined distance and the current time-of-day is earlier than a pre-defined time-of-day. The operational state of an appliance may be changed when the remaining time-of-travel is less than a pre-defined time-of-travel and the current time-of-day is later than a pre-defined time-of-day. The operational state of an appliance may be changed when the remaining time-of-travel is greater than a pre-defined time-of-travel and the current time-of-day is later than a pre-defined time-of-day. The operational state of an appliance may be changed when the remaining time-of-travel is less than a pre-defined time-of-travel and the current time-of-day is earlier than a pre-defined time-of-day. The operational state of an appliance may be changed when the remaining time-of-travel is greater than a pre-defined time-of-travel and the current time-of-day is earlier than a pre-defined time-of-day.

Another embodiment of the present invention comprises a system for automatically changing an operational state of an appliance associated with a known fixed location. The system includes means for automatically determining a current location of an individual with respect to the known fixed location. The system further includes means for automatically determining if an operational state of at least one appliance associated with the known fixed location is to be changed based on at least the current location with respect to the known fixed location. The system also includes means for automatically changing the operational state of the at least one appliance if the operational state is to be changed. The known fixed location may include one of a house, an apartment, a residential complex, an office building, a place of business, and an industrial park. The appliance may include at least one of a lighting device, a heating system, a cooling system, a computer device, a cooking appliance, a security system, a window covering controller, a coffee maker, a heating system of a swimming pool, a hot tub, a Jacuzzi, a fireplace, and a garage door opener. The means for automatically changing the operational state of an appliance may include means for changing the operational state between one of an "ON" state and an "OFF" state, an "OPEN" state and a "CLOSED" state, an "UNBOOTED" state and a "BOOTED" state, an "ARMED" state and a "DISARMED" state, an "ACTIVATED" state and a "DE-ACTIVATED" state, "ONE PRE-PROGRAMMED" state and "ANOTHER PRE-PROGRAMMED" state, "ONE PRE-DEFINED" state and "ANOTHER PRE-DEFINED" state, a "COOKING" state and a "NON-COOKING" state, an "ENABLED" state and a "DISABLED" state. The system may further include means for automatically determining a current distance between the current location and the known fixed location. The operational state of the appliance may be changed when the current distance is less than a pre-defined distance or when the current distance is greater than a pre-defined distance. The system may also include means for determining at least one of a current time-of-day, a current day-of-the-week, and a current date. The system may further include means for automatically determining a remaining time-of-travel between the current location and the known fixed location based on the current location, the known fixed location, and at least one of the current time-of-day, the current day-of-the-week, and the current date. The operational state of an appliance may be changed when the remaining time-of-travel is less than a pre-defined time-of-travel or when the remaining time-of-travel is greater than a pre-defined time-of-travel. The operational state of an appliance may be changed when the current distance is less than a pre-defined distance and the current time-of-day is later than a pre-defined time-of-day. The operational state of an appliance may be changed when the current distance is greater than a pre-defined distance and the current time-of-day is later than a pre-defined time-of-day. The operational state of an appliance may be changed when the current distance is less than a pre-defined distance and the current time-of-day is earlier than a pre-defined time-of-day. The operational state of an appliance may be changed when the current distance is greater than a pre-defined distance and the current time-of-day is earlier than a pre-defined time-of-day. The operational state of an appliance may be changed when the remaining time-of-travel is less than a pre-defined time-of-travel and the current time-of-day is later than a pre-defined time-of-day. The operational state of an appliance may be changed when the remaining time-of-travel is greater than a pre-defined time-of-travel and the current time-of-day is later than a pre-defined time-of-day. The operational state of an appliance may be changed when the remaining time-of-travel is less than a pre-defined time-of-travel and the current time-of-day is earlier than a pre-defined time-of-day. The operational state of an appliance may be changed when the remaining time-of-travel is greater than a pre-defined time-of-travel and the current time-of-day is earlier than a pre-defined time-of-day.

These and other novel features of the subject matter of the present application, as well as details of illustrated embodiments thereof, will be more fully understood from the following description and drawings.

DETAILED DESCRIPTION

Figure 1:
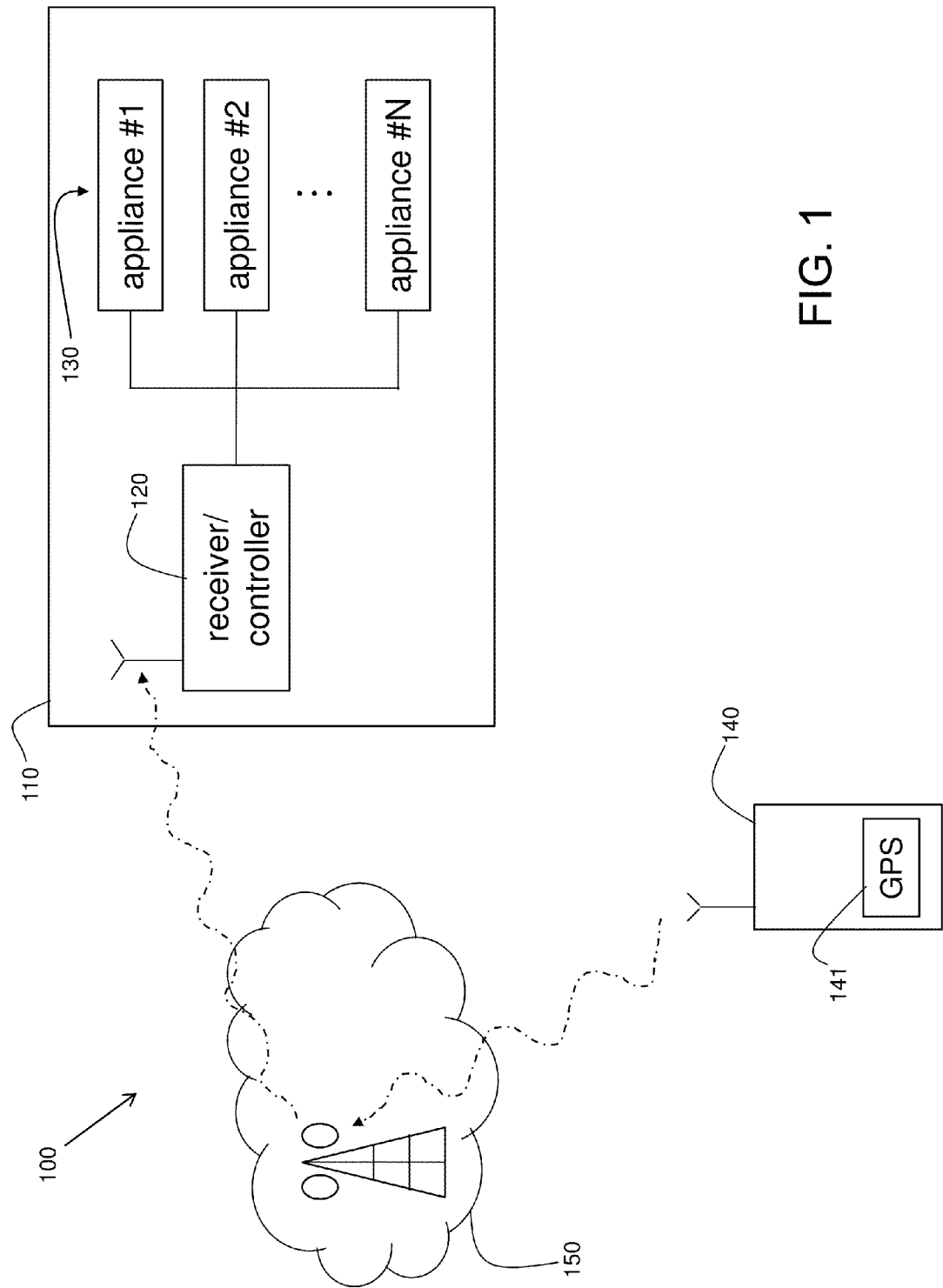
FIG. 1 illustrates a functional block diagram of an embodiment of a system for automatically changing an operational state of an appliance associated with a known fixed location.

FIG. 1 illustrates a functional block diagram of an embodiment of a system 100 for automatically changing an operational state of one or more appliances 130 (e.g., appliance #1 to appliance #N, where N is the number of appliances) associated with a known fixed location 110. The known fixed location may be a house, an apartment, a residential complex, an office building, a place of business, an industrial park, or any other known fixed location comprising one or more buildings or structures having appliances. The term "known fixed location" is used broadly herein to mean any location having at least one appliance associated with it.

The one or more appliances 130 may include any of, for example, a lighting device or configuration (e.g., indoor or outdoor lights), a heating and cooling system (e.g., an HVAC system), a computer device (e.g., a desktop computer), a cooking appliance (e.g., an oven), a security system, a window covering apparatus (e.g., motorized curtains or blinds), a coffee maker, a heating system of a swimming pool, a hot tub, a Jacuzzi, a fireplace, a garage door opener, or any other appliances or combinations thereof. The term "appliance" is used herein broadly to mean any device that has at least two operational states, one of which may be an "OFF" state, a "DISABLED" state, or a "DE-ACTIVATED" state, for example.

The system 100 includes a receiver/controller 120 at the fixed location which is operationally connected (wired or wirelessly) to each of the appliances 130 to provide operational state commands to the appliances 130. In accordance with an embodiment of the present invention, an operational state command is a signal or message which commands an appliance to change its operational state. Such changes or transitions in operational states may be between, for example, an "ON" state and an "OFF" state, an "OPEN" state and a "CLOSED" state, an "UNBOOTED" state and a "BOOTED" state, an "ARMED" state and a "DISARMED" state, an "ACTIVATED" state and a "DE-ACTIVATED" state, "ONE PRE-PROGRAMMED" state and "ANOTHER PRE-PROGRAMMED" state, "ONE PRE-DEFINED" state and "ANOTHER PRE-DEFINED" state, a "COOKING" state and a "NON-COOKING" state, an "ENABLED" state and a "DISABLED" state. Changes between other operational states are possible as well, in accordance with various embodiments of the present invention.

Within the fixed location 110, the interfaces between the receiver/controller 120 and the various appliances 130 may be wired, wireless, or some combination thereof. Each of the appliances 130 includes a communication interface using a communication protocol that is capable of receiving operational state commands or signals from the receiver/controller 120. In accordance with an embodiment of the present invention, the communication interface/protocol of each appliance 130 is a common standard interface/protocol that is capable of communicating with the receiver/controller 120. In accordance with another embodiment of the present invention, each communication interface/protocol of each appliance 130 may be custom or proprietary, and the receiver/controller 120 is uniquely configured to interface with each appliance 130.

The system 100 also includes a mobile device 140 (e.g., a cellular telephone device, a notepad computer device, a dedicated transceiver device) and a communication network 150 (e.g., a cellular telephone network, the internet, a satellite communication network, or a combination thereof). Such communication networks are well known in the art. Other types of communication networks are possible as well, in accordance with other embodiments of the present invention. The mobile device 140 is configured to wirelessly communicate with the communication network 150. The communication network 150 is configured to communicate (wired and/or wirelessly) with the receiver/controller 120 at the fixed location 110. In accordance with an alternative embodiment of the present invention, the mobile device 140 communicates directly with the receiver/controller 120, not through an intermediate communication network. In accordance with an embodiment of the present invention, the mobile device 140 includes a GPS receiver 141 configured to receive GPS signals to provide a current location of the mobile device 140.

Figure 2:
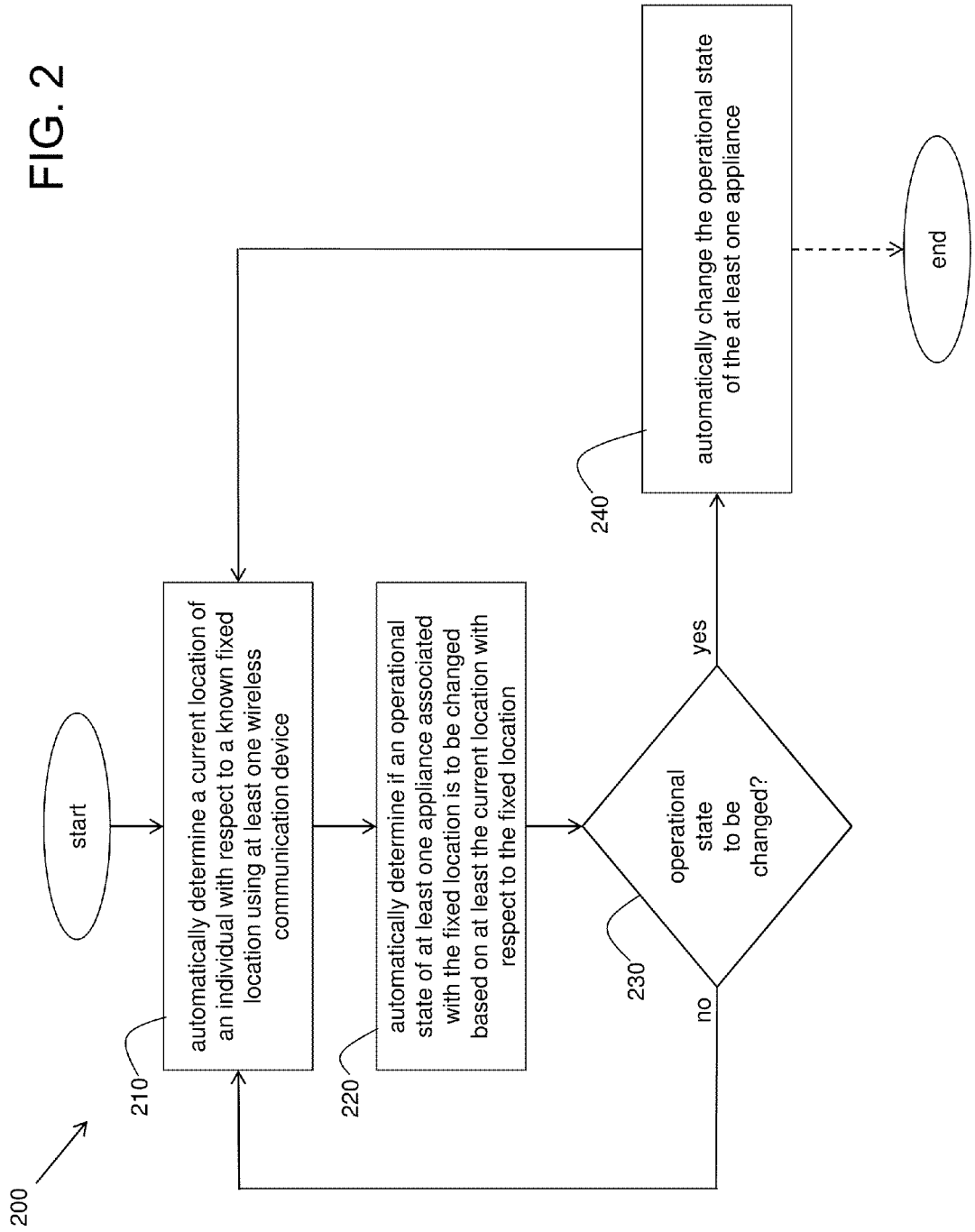
FIG. 2 is a flowchart of an embodiment of a method of automatically changing an operational state of an appliance associated with a known fixed location using the system of FIG. 1.

FIG. 2 is a flowchart of an embodiment of a method 200 of automatically changing an operational state of an appliance 130 associated with a known fixed location 110 using the system 100 of FIG. 1. In step 210 of the method 200, a current location of an individual with respect to a known fixed location is automatically determined using at least one wireless communication device. In step 220, it is automatically determined if an operational state of at least one appliance associated with the fixed location is to be changed based on at least the current location with respect to the fixed location. In step 230, if the operational state of an appliance is not to be changed, then the method 200 reverts back to step 210 to continue updating the current location. Otherwise, in step 230 if the operational state of an appliance is to be changed, then in step 240, the operational state of the appliance is changed and the method reverts back to step 210. Optionally, the method simply ends after changing the operational state of the appliance. In accordance with an embodiment of the present invention, the receiver/controller 120 may send an acknowledge signal or message back to the mobile device 140 via the communication network 150 to confirm that the operational state of the appliance has been changed. In such an embodiment, the receiver/controller 120 may actually be a transceiver/controller, capable of both transmitting and receiving.

Figure 3:
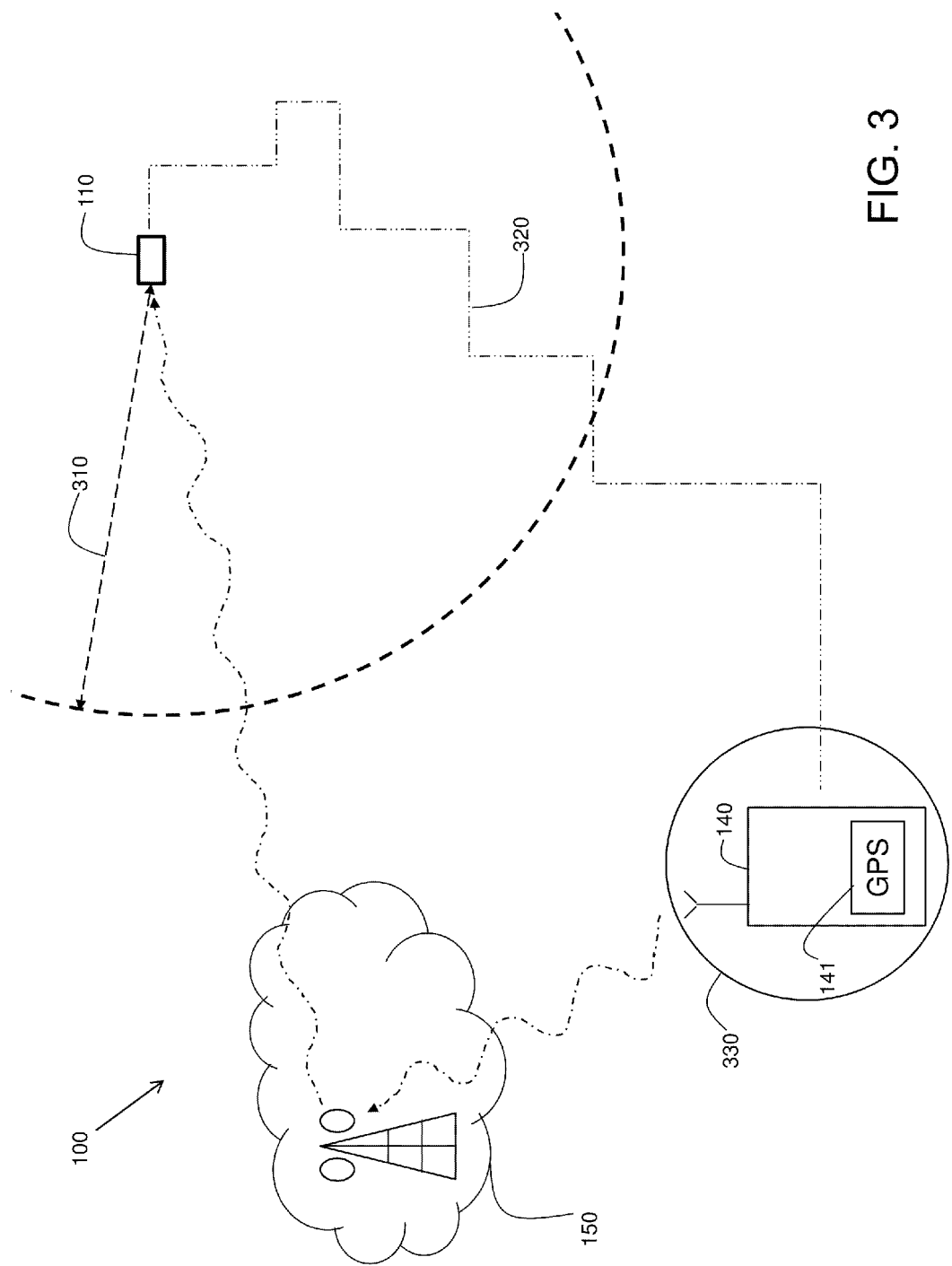
FIG. 3 illustrates another functional view of the system of FIG. 1 illustrating the concept of distance between an individual having a mobile device and the known fixed location.

FIG. 3 illustrates another functional view of the system 100 of FIG. 1 illustrating the concept of distance and time-of-travel between an individual having a mobile device 140 and the known fixed location 110. For example, employing the method 200 of FIG. 2, a user of the mobile device 140 may be traveling towards the known fixed location 110 (e.g., the user's home) from the user's place of work in the user's automobile. The system 100 is configured to determine when the current location 330 of the user (via the current location of the mobile device 140) is within a pre-defined distance (e.g., a radial distance 310) of the known fixed location 110. When the system 100 determines that the user's current location is within the pre-defined distance, the system 100 may command an appliance 130 to change operational state. For example, indoor lights at the known fixed location may be commanded to change from an "OFF" operational state to an "ON" operational state.

Alternatively, instead of being a radial distance 310, the pre-defined distance may be a pre-defined remaining driving distance from the current location 330 of the user to the known fixed location 110 based on an actual driving route 320 taken by the user's automobile. When the system 100 determines that the user's current location 330 on the driving route 320 causes the user's actual remaining driving distance to be less than the pre-defined remaining driving distance, the system 100 may command an appliance 130 to change operational state. For example, a desktop computer may be commanded to change from an "UN-BOOTED" operational state to a "BOOTED" operational state.

Furthermore, instead of using distance as a comparative trigger, the system 100 may use time-of-travel as a comparative trigger. For example, again employing the method 200 of FIG. 2, a user of the mobile device 140 may again be traveling towards the known fixed location 110 (e.g., the user's home) from the user's place of work in the user's automobile following the driving route 320. By keeping track of the user's current location 330 on the driving route 320, the system 100 is able to compute an estimated remaining time-of-travel along the driving route 320 between the current location 330 and the fixed location 110. When the estimated remaining time-of-travel becomes less than a pre-defined time-of-travel (e.g., 10 minutes from home), the system 100 may command an appliance 130 to change operational state. For example, a microwave oven may be commanded to change from a "NON-COOKING" operational state to a "COOKING" operational state. For example, the user may have left some un-cooked vegetables in the microwave oven before leaving for work in the morning.

Various factors that may go into estimating the remaining time-of-travel may include not only the current location 330 of the user but also at least one of a current time-of day, a current day-of-the-week, and a current date. For example, if the user is traveling home from work along the route 320 during rush hour on a weekday, the estimated remaining time-of-travel for any current location 330 along the route 320 may be considerably longer than if the user is traveling home from work along the route 320 at lunch time, or on a holiday. Furthermore, in accordance with an embodiment of the present invention, if the speed of the user's automobile is being monitored (e.g., by BLUETOOTH communication between the automobile and the mobile device 140), then the speed (e.g., the user's average speed) may factor into the estimation of remaining time-of-travel. Current time-of-day, current day-of-the-week, and current date may be determined by a clock/calendar capability within the mobile device 140. Other means for the system 100 to determine such parameters are possible as well, in accordance with various embodiments of the present invention. Furthermore, if real-time (or near-real-time) traffic information is available to the system 100, the system 100 may be configured to take into consideration such traffic information when estimating the remaining time-of-travel.

Figure 4:
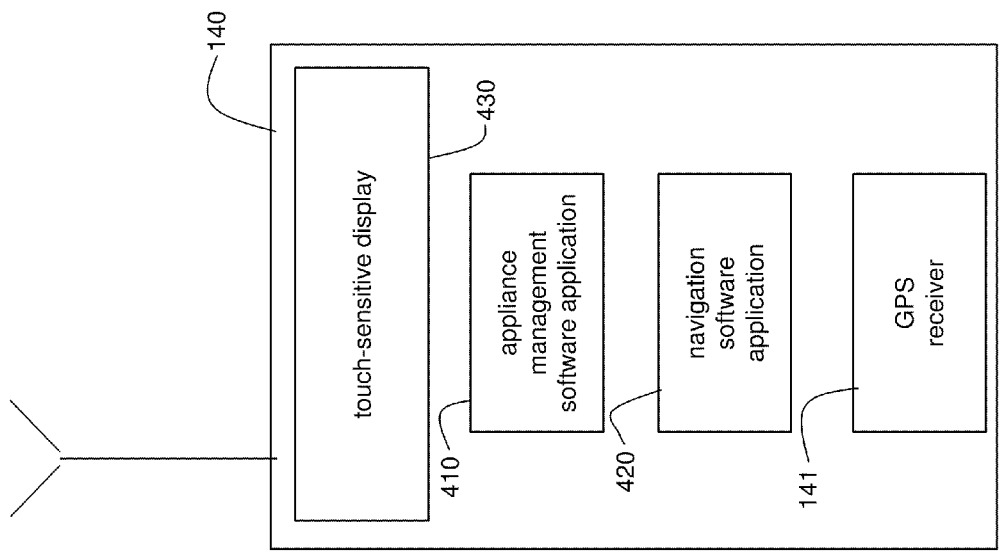
FIG. 4 illustrates a functional block diagram of a more detailed embodiment of the mobile device of FIG. 1.

FIG. 4 illustrates a functional block diagram of a more particular embodiment of the mobile device 140 of FIG. 1. In accordance with an embodiment of the present invention, the mobile device 140 includes an appliance management (AM) software application 410 that runs on a processor of the mobile device 140. The AM software application 410 is programmed to know the location of the fixed location 110 and to automatically determine the current location 330 of the mobile device 140 (and, therefore, the current location of the user), for example, by reading the GPS information provided by the GPS receiver 141. The AM software application 410 is further programmed to use the current location 330 of the mobile device 140 and the known fixed location 110 to automatically determine at least one of a distance between the mobile device 140 and the fixed location 110 and a time-of-travel between the mobile device 140 and the fixed location 110. Again, the distance may be a radial distance or a remaining driving distance, for example.

The AM software application 410 stores a pre-defined distance or a pre-defined time-of-travel which acts as a comparative threshold. Once the determined distance (or the remaining time-of-travel) between the mobile device 140 and the fixed location 110 becomes less than the corresponding threshold, then the mobile device 140 sends a command signal or message to the receiver/controller 120 at the fixed location 110 via the communication network 150 to change the operational state of one or more appliances 130 at the fixed location.

The mobile device 140 may also include a navigation or location-based services software application 420 that receives GPS information from the GPS receiver 141 and communicates with the AM software application 410 to provide, for example, current location, remaining actual driving miles and/or remaining time-of-travel between the current location 330 and the fixed location 110 along a route 320. The AM software application 410 may then compare the remaining actual driving miles or the remaining time-of-travel to an appropriate pre-defined threshold of the AM software application 410 to determine if an operational state of an appliance 130 should be changed. In accordance with an embodiment of the present invention, the functionality of the navigation software application 420 is integrated with the functionality of the AM software application 410 constituting a single software application.

In accordance with an embodiment of the present invention, the user "sets up" (programs) the AM software application 410 via a user interface 430 of the mobile device 140 to define conditional changes of operational states of one or more appliances 130 associated with the known fixed location 110. The user interface 430 may include a menu-driven touch-sensitive display device, for example, as illustrated in FIG. 4. For example, a user may select an appliance 130 (e.g., appliance #1) via the user interface 430 of the mobile device 140 and conditionally program the operational state of the appliance 130 to change from one defined state to another defined state as triggered by a defined conditioning event (e.g., when the distance between the mobile device 140 and the fixed location 110 falls below a pre-defined threshold value).

As an example, during the winter months, the user may desire to keep the inside temperature of his house at 63° F. during the day when he is at work, and at 68° F. when he is at home. The user wants to give the heating and cooling system 30 minutes to transition to the warmer state before he gets home. Therefore, the user of the mobile device 140 may program a first appliance, being a heating and cooling system, to change operational states from maintaining a first temperature (e.g., 63° F.) to maintaining a second temperature (e.g., 68° F.) within the fixed location 110 (e.g., a house) when the mobile device 140 gets to within 30 minutes of the fixed location 110.

Furthermore, the user may desire to keep all lights off at his house during the day when he is at work, and turn certain indoor and outdoor lights on when he gets within one mile of home. Therefore, the user may program a second appliance, being a combination of indoor and outdoor lighting, to change from a first active lighting configuration (e.g., all lights off) to a second active lighting configuration (e.g., certain indoor lights on and certain outdoor lights on) when the mobile device 140 gets to within one mile of the fixed location 110.

Also, the user may desire to keep the heating setting of a crock pot on "low" during the day when he is at work, allowing a pot roast to slowly cook, and then change the heating setting of the crock pot to "high" when he gets within 15 minutes of home to make sure the pot roast is done cooking when he gets home. Therefore, the user may program a third appliance, being a crock pot, to change from a first cooking setting to a second cooking setting when the mobile device 140 gets to within 15 minutes of the fixed location 110.

Depending on the user's needs, some appliances 130 may be "set up" and not changed for a relatively long period of time, whereas the "set up" of other appliances 130 may be changed on a daily basis, for example. With respect to the heating and cooling system and the indoor and outdoor lighting, the user may program the mobile device 140 in the fall season and not change the programming until the spring season arrives, allowing the programmed changes in operational state to occur all winter long. However, with respect to the crock pot, the user may program the mobile device 140 only for a single day.

In general, the entire home of the user may be "woken up" or "put to sleep" in response to triggering one or more threshold events. For example, if a user is going away on vacation, the user may program the system such that many appliances within the home "go to sleep" while the user is on vacation (e.g., when the user gets more than 200 miles from home) and then "wake up" when the user returns from vacation (e.g., when the user gets within 100 miles of home). In such a scenario appliances that control utilities, such as water and natural gas, may be automatically turned off and subsequently re-activated.

In accordance with an embodiment of the present invention, the user-programmed mobile device 140 sends command messages to the receiver/controller 120, via the communication network 150, upon triggering of the programmed conditions. The command messages may include, for example, an appliance identifier and any related data such as a temperature setting or a lighting configuration which tells the receiver/controller 120 which operational state changes to make. In such an embodiment, the receiver/controller 120 acts as a simple intermediary between the mobile device 140 and the appliances 130 by simply changing the state of the various appliances according to the received command messages.

In accordance with an alternative embodiment of the present invention, the mobile device 140 may simply send current location information to the receiver/controller 120 and the receiver/controller 120 may host the AP software application 410 and is programmed by the user to trigger certain changes of operational states of certain appliances 130 based on the current location information from the mobile device 140. In such an embodiment, the receiver/controller 120 contains the "state-changing intelligence" of the system 100.

In general, the functionality of the steps of the method 200 of FIG. 2 may be distributed between the mobile device 140 and the receiver/controller 120, in accordance with various embodiments of the present invention. For example, a first software application on the mobile device 140 may determine distance and/or time-of-travel between the mobile device 140 and the fixed location 110, and the receiver/controller 120 may include a second software application to perform the threshold comparisons which trigger the changes of operational states of the appliances.

In accordance with various embodiments of the present invention, the receiver/controller 120 may be anything from a simple state mapping machine (that receives input commands or signals which get mapped to output commands or signals to the various appliances), to a processor-based computer running a sophisticated appliance management software application as described herein.

Figure 5:
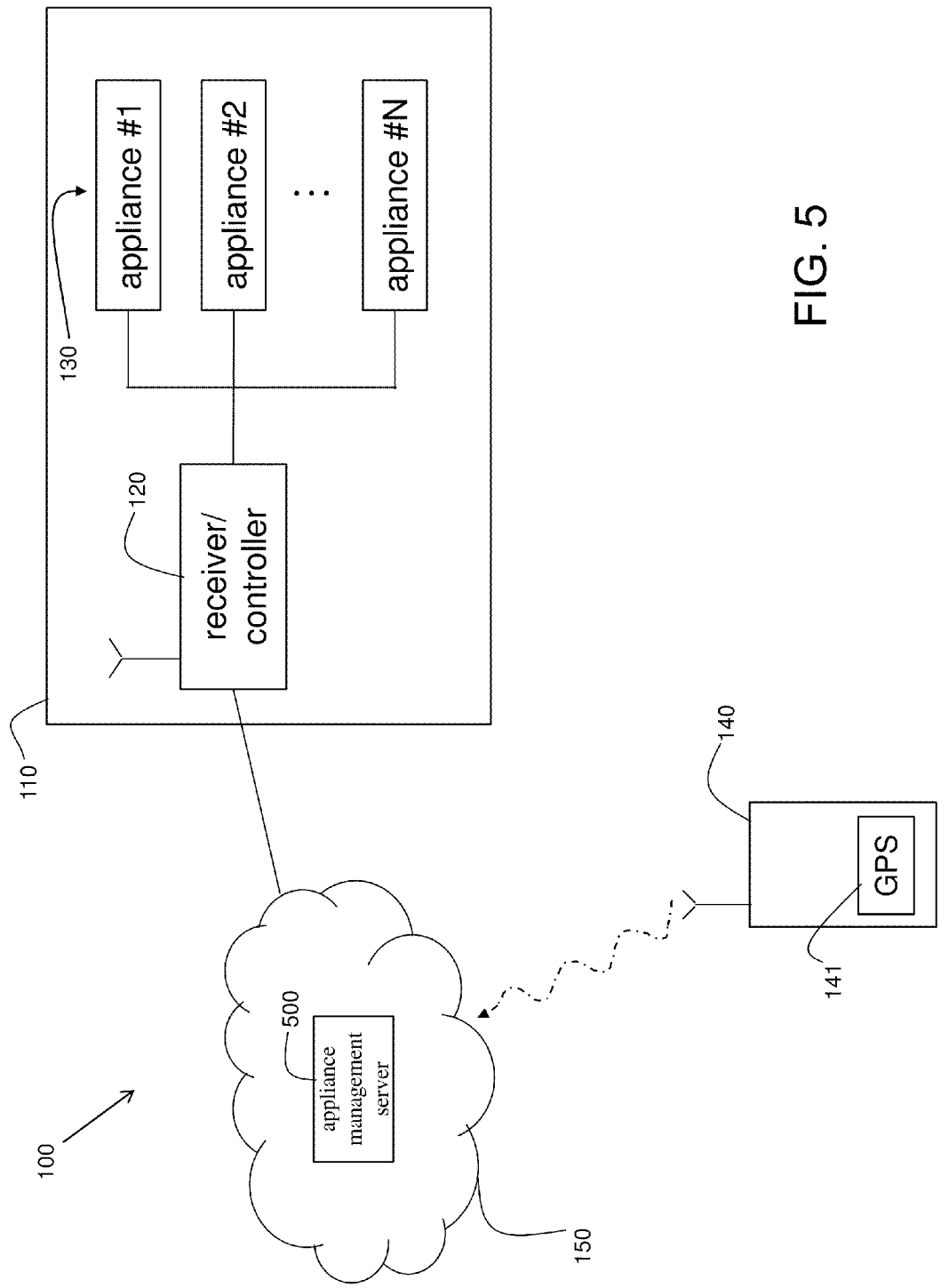
FIG. 5 illustrates a functional block diagram of the system of FIG. 1 further showing an appliance management server as part of the communication network.

As a further alternative, the system 100 may include an appliance management (AP) server 500 as part of the communication network 150 which hosts an AP software application 410. FIG. 5 illustrates a functional block diagram of the system 100 of FIG. 1 further showing an appliance management server 500 as part of the communication network 150. The mobile device 140 simply sends current location information to the server 500 (e.g., via a cellular telephone network and/or a wireless connection to the internet) and the AP software application 410 of the server 500 determines if an operational state of an appliance 130 is to be changed, and sends an appropriate command message or signal to the receiver/controller 120 which then simply directs the appliance 130 to change state accordingly.

In accordance with an embodiment of the present invention, the AP server 500 may be associated with a community such as a neighborhood, an apartment complex, or a condominium complex, for example. As a result, the AP server 500 may receive commands from multiple user's associated with the community and selectively provide the appropriate commands to the receiver/controllers at the appropriate individual houses or apartments.

In accordance with another embodiment of the present invention, the AM software application 410 is capable of adapting its functionality in dependence on individuals in the vehicle traveling toward or away from the known fixed location 110. For example, a user may be able to enter, via the user interface 430, information that identifies the adults and children that are in the vehicle. The AM software application 410 is set up to enable/disable various combinations of appliances 130 at the fixed location 110, in dependence on the adult/children information entered. For example, if a teenage girl is in the vehicle (e.g., the user's daughter), then the system 100 may be set up to turn on and boot up her personal computer in her bedroom when the vehicle is within two miles of home.

In accordance with a further embodiment of the present invention, the mobile device 140 is capable of receiving signals transmitted from landmarks. For example, a particular roadway intersection may have a small transmitter installed on a traffic light which transmits a landmark signal that indicates the location of the intersection. When a user in a vehicle having the mobile device 140 approaches or enters the intersection, the mobile device 140 receives the signal and the AM software application may proceed to trigger various changes in operational states of various appliances in response to receiving the signal, as programmed by the user. Other landmarks equipped with such transmitters may be, for example, a bank, a church, a town hall, etc. Alternatively, the landmark may be equipped with an RFID tag which can be read by an RFID reader installed on the vehicle. Such RFID embodiments are described later herein.

Other alternative means of determining the current location of a user may include externally tracking a user's automobile as the user drives on the roadway. Examples of such means are disclosed in U.S. patent application Ser. No. 11/778,129, which is incorporated by reference herein, and as described with respect to FIGS. 6-9 below herein.

Figure 6:
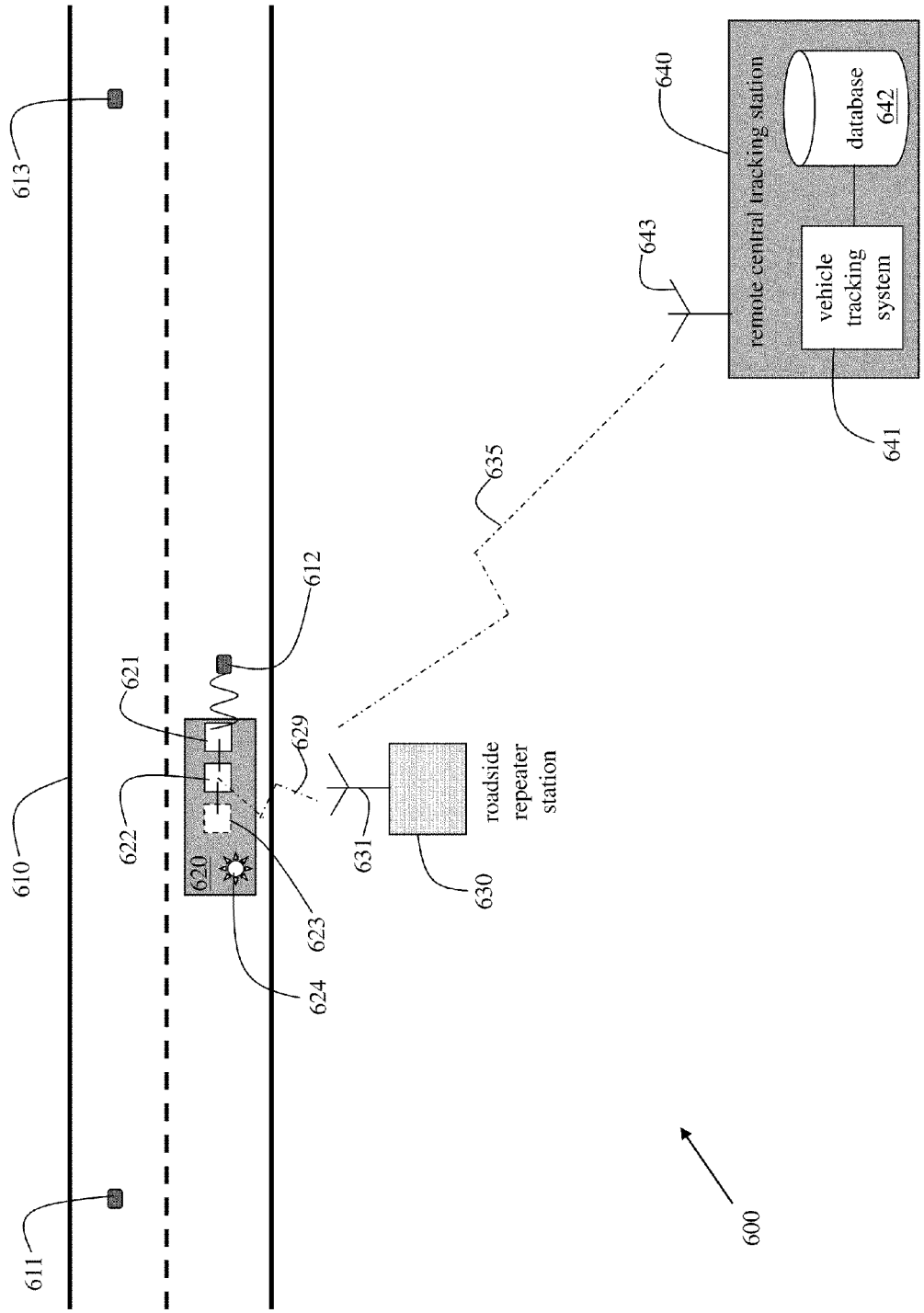
FIG. 6 is a schematic illustration of an exemplary first embodiment of a system for monitoring vehicles on a roadway, in accordance with various aspects of the present invention.

FIG. 6 is a schematic illustration of an exemplary first embodiment of a system 600 for monitoring vehicles on a roadway, in accordance with various aspects of the present invention. The system comprises a plurality of RFID tags (e.g., 611, 612, 613) affixed at various pre-designated locations along a roadway 610. Each RFID tag is encoded with RFID tag information that may be used to determine a physical location of any of the RFID tags on the roadway 610. The RFID tags may be passive RFID tags or active RFID tags and are positioned substantially in the center of the lanes of the roadway, in accordance with an embodiment of the present invention. Other non-centered positions are possible as well. The encoded information within each of the RFID tags may be, for example, physical geographic position information, global positioning system (GPS) coordinates, or a unique RFID tag identification code. The RFID tags (e.g., 611 and 613) in one lane may be staggered with respect to the RFID tags (e.g., 612) in an adjacent lane to help ensure that any given vehicle may interrogate only one RFID tag at any given time.

An RFID tag typically includes an electronic chip which is permanently affixed to a substrate having a small antenna. An RFID tag may or may not be environmentally sealed in a housing. Each RFID tag may be programmed with a unique code and may be tuned to operate at a certain radio frequency which is optimized for the application. Other information may be programmed into the RFID tag as well. An active RFID tag regularly transmits a signal containing the encoded information in the tag. A passive RFID tag transmits a signal containing the encoded information in the tag only when the RFID tag is interrogated by an RFID scanner. The RFID tags of certain embodiments of the present invention are environmentally sealed such that they may be affixed in lanes of a roadway and stand up to the environmental conditions of the roadway.

The system 600 further comprises an RFID scanner 621 installed on a vehicle 620 to interrogate the RFID tags (e.g., 612) as the vehicle 620 travels on the roadway 610, and to also receive the RFID tag information from the RFID tags as the vehicle 620 encounters any of the RFID tags (e.g., 611, 612, 613) on the roadway 610. The system 600 also includes a transceiver 622 installed in the vehicle and operatively connected to the RFID scanner 621 to receive the RFID tag information from the RFID scanner and to re-encode and transmit at least the RFID tag information wirelessly as an RF signal 629.

As an option, the system 600 may include a driver's license reader device 623 which is operatively connected to the transceiver 622 to read a driver identification code on a driver's license when the driver's license is presented to the driver's license reader device 623 and to transfer the driver identification code to the transceiver 622. The driver identification code on the driver's license may be read by the reader device 623 in any of a number of ways. For example, the driver's license may be inserted into a slot in the reader device 623 to be read by the reader device 623. Alternatively, the driver's license may be swept in front of the reader device 623 to be read by the reader device 623. The reader device 623 may be an optical reader, a bar code reader, a magnetic strip reader, or any other kind of reader capable of reading a code off of a driver's license or other identifying card, in accordance with various embodiments of the present invention. The transceiver 622 encodes the driver identification code onto the RF signal 629 along with the RFID tag information, in accordance with an embodiment of the present invention.

The scanner 621, transceiver 622, reader device 623, or any combination thereof may each be separate devices or may be integrally combined into a single device, in accordance with various embodiments of the present invention.

The system 600 further includes at least one roadside repeater station 630 to wirelessly receive at least the RF signal 629 from the transceiver 622 and to re-transmit the information encoded in the RF signal 629. The roadside repeater station 630 may include at least one antenna 631 for the reception and/or transmission of RF signals.

The system 600 also comprises a remote central tracking station 640 to receive and process the transmitted information from the roadside repeater station 630 in order to track a position of the vehicle 620 on the roadway 610. The central tracking station 640 may include at least one antenna 643 to receive RF signals transmitted by the roadside repeater station 630. In accordance with an embodiment of the present invention, the remote central tracking station 640 provides the current location of the vehicle 620 to the receiver/controller 120 via the communication network 150, where the receiver/controller 120 includes the functionality of the AM software application 410. Alternatively, the appliance management server 500 or the remote central tracking station 640 may include the functionality of the AM software application 410 as described herein.

In accordance with an embodiment of the present invention, the central tracking station 640 may be located near and associated with a community such as a neighborhood or an apartment complex, for example. As a result, the central tracking station 640 may receive commands from various user's associated with the community and selectively provide the appropriate commands to the receiver/controllers at the appropriate individual houses or apartments.

Figure 7:
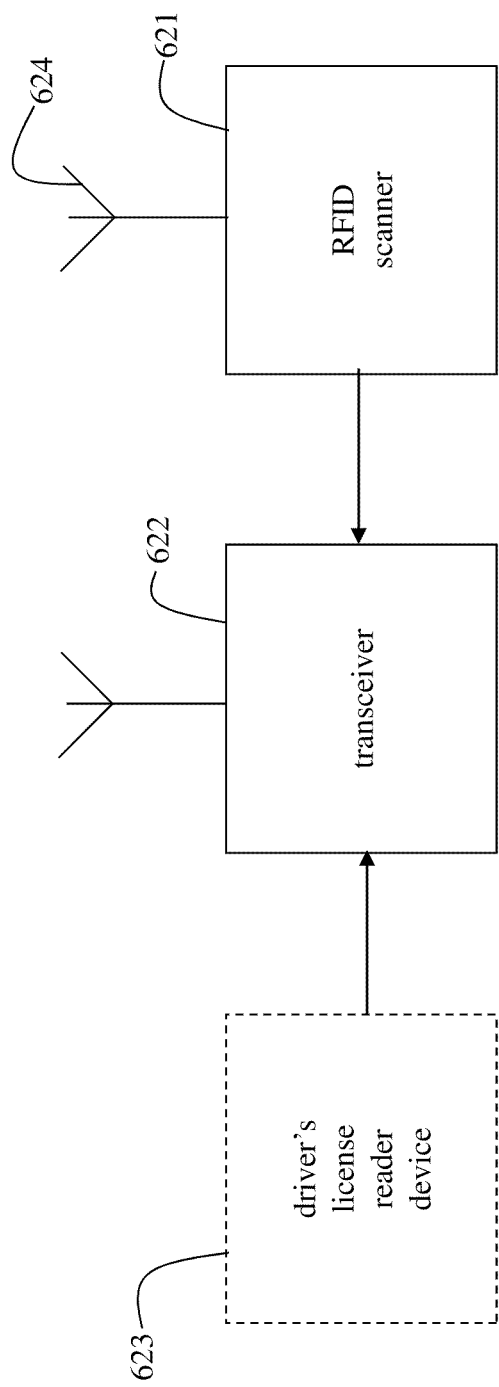
FIG. 7 is a schematic block diagram of an exemplary embodiment of subsystems of the system of FIG. 6 which are installed in a vehicle, in accordance with various aspects of the present invention.

FIG. 7 is a schematic block diagram of an exemplary embodiment of subsystems 621-623 of the system 600 of FIG. 6 which are installed in a vehicle 620, in accordance with various aspects of the present invention. The RFID scanner 621 includes at least one antenna 624 for interrogating the RFID tags along the roadway 610 and for receiving the information encoded in the RFID tags whenever an RFID tag is interrogated by the scanner 621. In accordance with various embodiments of the present invention, the antenna 624 may be mounted on a front portion of the vehicle 620, on a back portion of the vehicle 620, or on a bottom portion of the vehicle 620.

The transceiver 622 is capable of receiving the RFID tag information from the RFID scanner 621 (e.g., over a digital communication link). The transceiver 622 is also capable of receiving a driver identification code from the driver's license reader device 623 (e.g., over a digital communication link). The transceiver 622 is able to encode the RFID tag information and/or the driver identification code onto an RF signal 629. Also, in accordance with an embodiment of the present invention, the transceiver 622 stores a vehicle identification code corresponding to the vehicle 620 in which the transceiver 622 is installed. The transceiver 622 is able to also encode the vehicle identification code onto the RF signal 629 along with the RFID tag information and/or the driver identification code. As a result, any or all of the RFID tag information, driver identification code, and vehicle identification code may be transmitted via RF signal 629 to the roadside repeater station 630. Various known encoding schemes and protocols may be used to encode and transmit the RF signal 629, in accordance with various embodiments of the present invention. Every time the vehicle 620 encounters an RFID tag (e.g., 612) on the roadway 610 and successfully interrogates the encountered RFID tag and receives the RFID tag information from the RFID tag, the transceiver 622 will encode at least the RF ID tag information in an RF signal 629 which is transmitted to a roadside repeater station 630.

In accordance with an embodiment of the present invention, the roadside repeater station 630 comprises a simple RF receiver and transmitter. The receiver of the roadside repeater station 630 receives RF signals 629 from vehicles 620 that are within a field-of-reception of the roadside repeater station 630. The roadside repeater station 630 then re-transmits the information encoded in the RF signal 629 as another RF signal 635 using the transmitter of the roadside repeater station 630. The original RF signal 629 transmitted by the transceiver 622 is typically of relatively low power compared to the RF signal 635 transmitted by the roadside repeater station 130. As a result, the transceiver 622 can transmit a relatively low power RF signal 629 to a nearest roadside repeater station 630. The roadside repeater station 630 then boosts the RF signal and transmits a relatively higher power RF signal 635 which may be received by the remote central tracking station 640, which may be quite a distance away from the vehicle 620. The roadside repeater station 630 may re-encode the information in the original RF signal 629 into the RF signal 635 using a different encoding technique than that used to encode the original RF signal 629, and may or may not transmit the RF signal 635 at a different frequency than the RF signal 629, in accordance with various embodiments of the present invention. In accordance with an embodiment of the present invention, the driver identification code or the vehicle identification code may be used by the system to correlate to the fixed location 110.

The remote central processing station 640 includes a vehicle tracking system 641 and a database 642, operatively connected together. The vehicle tracking system 641 extracts the information encoded in the RF signal 635 and uses the information to track the vehicle 620 on the roadway 610. For example, if the central tracking station 640 receives RFID tag information corresponding to the RFID tag 612 and a vehicle identification code corresponding to the vehicle 620, then the vehicle tracking system 641 is able to correlate the vehicle 620 with the location of the RFID tag 612. When the vehicle 620 encounters another RFID tag on the roadway 610, the vehicle tracking system 641 will be able to update the location of the vehicle 620 on the roadway 610 in a similar manner. As a result, the vehicle tracking system 641 is able to keep track of the vehicle 620 as it travels along the roadway 610.

In accordance with an embodiment of the present invention, whenever the transceiver 622 transmits an RF signal 629 with encoded RFID tag information, a time stamp is also encoded in the RF signal 629. As a result, the vehicle tracking station not only knows the location of the vehicle 620 but also the time at which the vehicle 620 arrived at that location. The vehicle tracking system 641 is able to use the location information and associated time stamp information to calculate an average velocity of the vehicle 620 between any two encountered RFID tag locations. In accordance with an embodiment of the present invention, the vehicle tracking system 641 may be able to use the location and velocity information to predict when the vehicle 620 will arrive at a next RFID tag location along the roadway 610 or at the fixed location 110.

In accordance with an embodiment of the present invention, the database 642 includes information which associates the RFID tag 612 with a particular roadway location including the lane in which the RFID tag is located. The database 642 also includes information which associates the vehicle identification code with a particular vehicle 620 and possibly an owner and/or driver of that vehicle 620.

Figure 8:
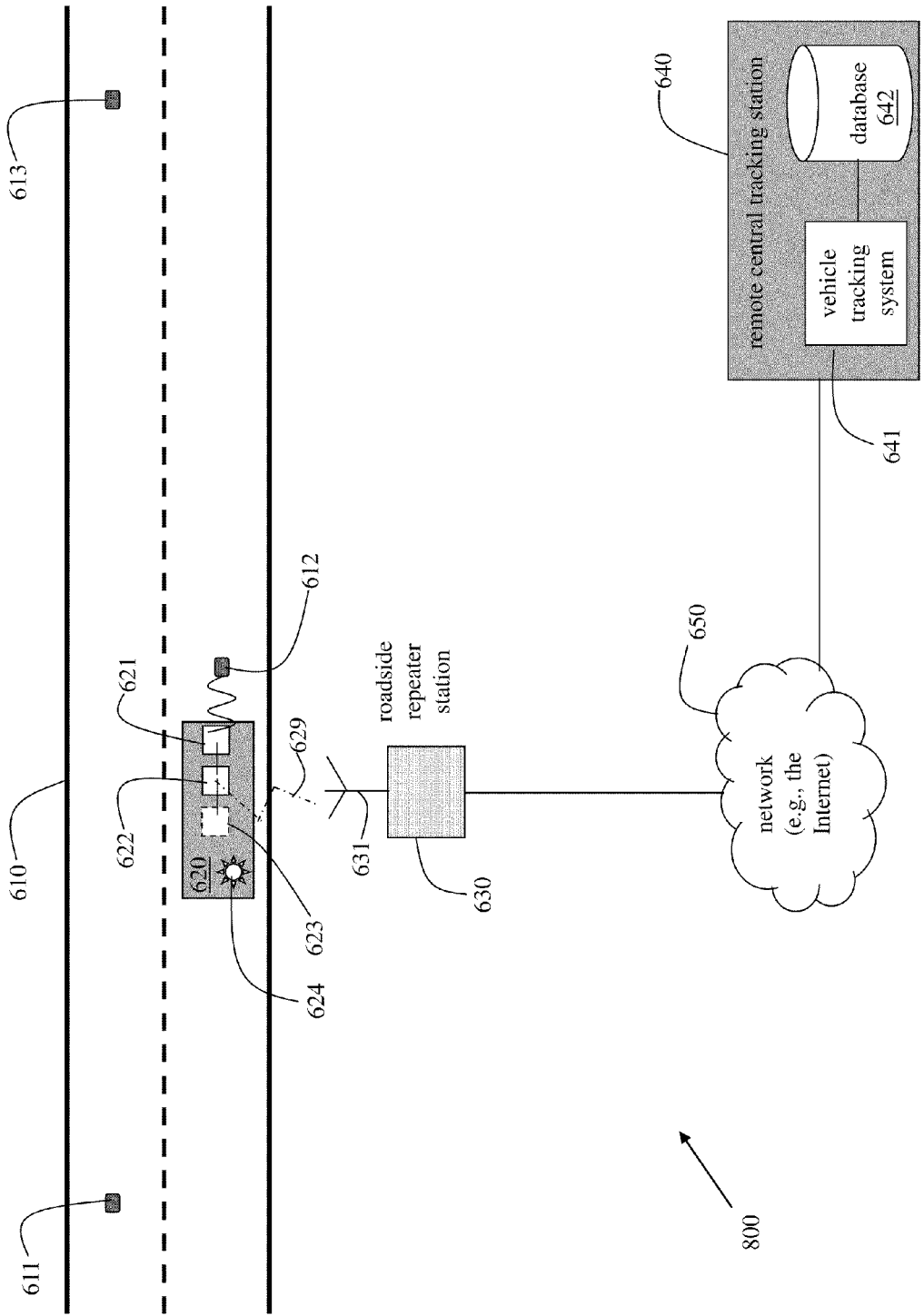
FIG. 8 is a schematic illustration of an exemplary second embodiment of a system for monitoring vehicles on a roadway, in accordance with various aspects of the present invention.

FIG. 8 is a schematic illustration of an exemplary second embodiment of a system 800 for monitoring vehicles on a roadway 610, in accordance with various aspects of the present invention. The system 800 is very similar to the system 600 of FIG. 6 except that the system 800 uses a network 650 (e.g., the Internet) to communicate between the roadside repeater station 630 and the remote central tracking station 640. The network 650 may comprise a totally wired network between the roadside repeater station 630 and the remote central tracking station 640, or a combination of a wired and wireless network. The same type of information, as described for the system 600 of FIG. 6, is conveyed from the roadside repeater station 630 to the central tracking station 640 in the system 800 of FIG. 8. The vehicle tracking system 641 and database 642 of the central tracking station 640 of FIG. 8 operate in a similar manner to that of FIG. 6 as previously described herein.

Figure 9:
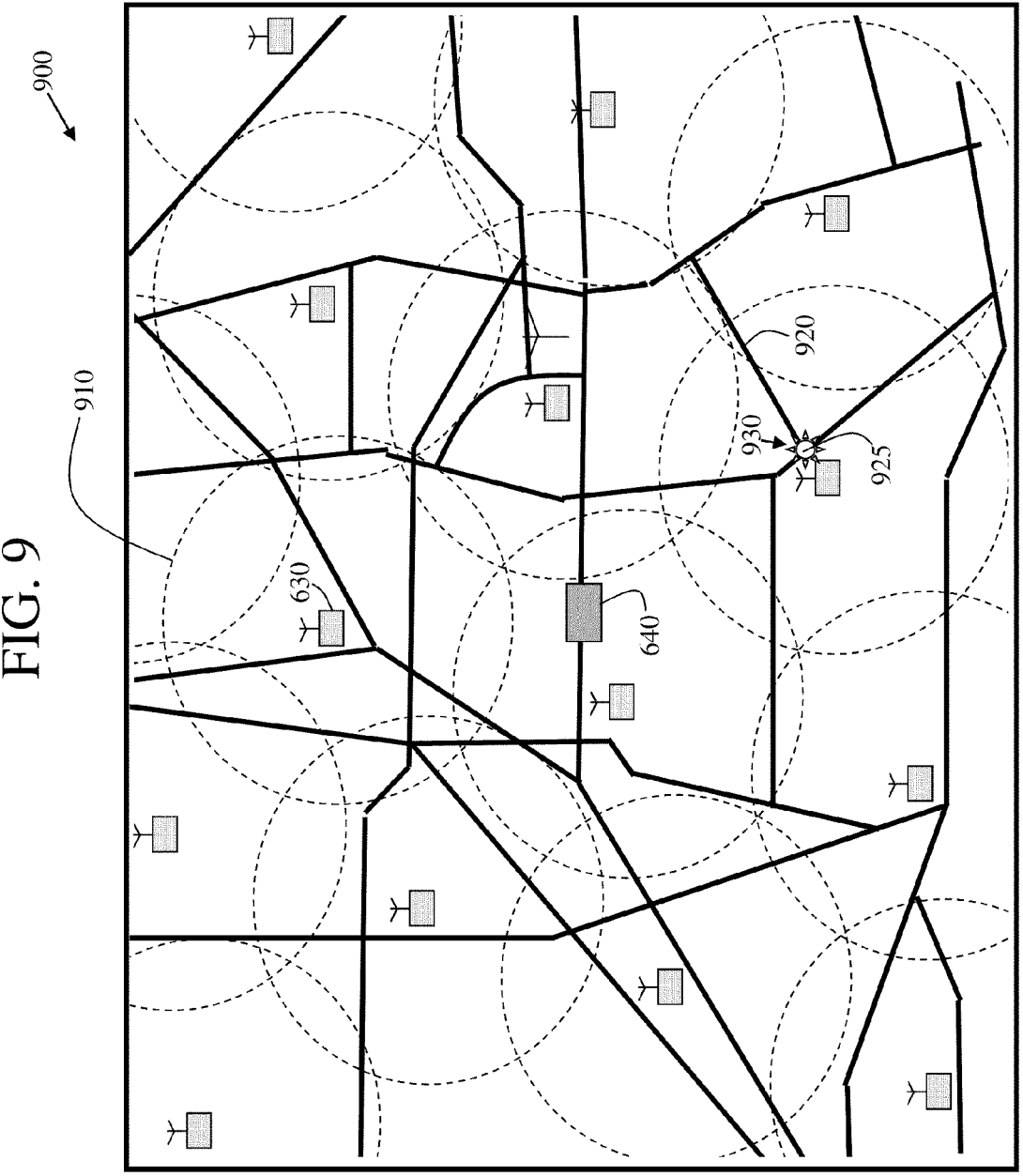
FIG. 9 is a schematic illustration showing the use of the system of FIG. 6 or FIG. 8 on an exemplary roadway, in accordance with an embodiment of the present invention.

FIG. 9 is a schematic illustration showing the use of the system 600 of FIG. 6 or the system 800 of FIG. 8 on an exemplary roadway 900, in accordance with an embodiment of the present invention. The roadway 900 includes a plurality of RFID tags strategically located along the roadway 900. For example, an RFID tag may be positioned every 200 feet along the roadway 900. A plurality of roadside repeater stations 630 are strategically placed at various locations along the roadway 900. Each roadside repeater station 630 includes a circle of reception 910 such that an RF signal 629 transmitted by any vehicle 620 within the circle of reception 910 may be received by that roadside repeater station 630 with a high probability of correct reception. The roadside repeater stations 630 are positioned such that the circles of reception 910 overlap such that a vehicle on any part of the roadway 900 may communicate with at least one roadside repeater station 630. A remote central tracking station 640 is strategically located on the roadway 900 such that any of the roadside repeater stations 630 may effectively communicate with the central tracking station 640. As a result, as vehicles (which are equipped with at least the RFID scanner and transceiver capabilities as previously described herein) travel along the various branches of the roadway 900, the vehicles will be able to be tracked by the central tracking station 640.

In accordance with an alternative embodiment of the present invention, instead of having RFID tags positioned on the roadway, each vehicle may have an RFID tag affixed to the vehicle (e.g., affixed to or embedded in a license plate on the vehicle) and RFID scanners may be strategically positioned along the roadway to scan the RFID tags of vehicles as they pass by the scanners. The scanned RFID tag information may then be passed from the scanner to a transceiver co-located with each scanner such that the RFID tag information is transmitted to a roadside repeater station and then passed to a remote central tracking station as previously described. The scanned RFID tag information may contain a vehicle identification code. The location of a scanned vehicle is known from the known position of the RFID scanner which scanned the vehicle. In accordance with a further alternative embodiment of the present invention, the transceiver could be the roadside repeater. Also, such an alternative embodiment does not, by itself, allow for a driver identification code to be read from a driver's license, for example. The RFID tag on a vehicle may be encoded with a driver identification code.

In summary, systems and methods for automatically changing an operational state of an appliance associated with a known fixed location are disclosed. A current location of an individual is automatically determined with respect to a known fixed location using at least one wireless communication device. The system automatically determines if an operational state of at least one appliance associated with the known fixed location is to be changed based on at least the current location of the individual. The operational state of the at least one appliance is automatically changed if it is determined that the operational state is to be changed.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method of automatically changing an operational state of an appliance associated with a known fixed location, said method comprising:
   automatically determining a common current location of two or more individuals with respect to said known fixed location using at least one wireless communication device;
   providing an identity of each of the two or more individuals at the common current location;
   automatically determining if an operational state of at least one appliance associated with said known fixed location is to be changed based on at least said common current location and the identity of each of the two or more individuals; and
   automatically changing said operational state of said at least one appliance if said operational state is to be changed.

2. The method of claim 1 wherein said known fixed location includes one of a house, an apartment, a residential complex, an office building, a place of business, and an industrial park.

3. The method of claim 1 wherein said at least one appliance includes at least one of a lighting device, a heating system, a cooling system, a computer device, a cooking appliance, a security system, and a window covering controller, a coffee maker, a heating system of a swimming pool, a hot tub, a Jacuzzi, a fireplace, and a garage door opener.

4. The method of claim 1 wherein said step of automatically changing said operational state of said at least one appliance includes at least one of:
   changing said operational state between an "ON" state and an "OFF" state,
   changing said operational state between an "OPEN" state and a "CLOSED" state,
   changing said operational state between an "UNBOOTED" state and a "BOOTED" state,
   changing said operational state between an "ARMED" state and a "DISARMED" state,
   changing said operational state between an "ACTIVATED" state and a "DE-ACTIVATED" state,
   changing said operational state between "ONE PRE-PROGRAMMED" state and "ANOTHER PRE-PROGRAMMED" state, changing said operational state between "ONE PRE-DEFINED" state and "ANOTHER PRE-DEFINED" state,
changing said operational state between a "COOKING" state and a "NON-COOKING" state, and
changing said operational state between an "ENABLED" state and a "DISABLED" state.

5. The method of claim 1 further comprising automatically determining a current distance between said current location and said known fixed location.

6. The method of claim 5 wherein said operational state of said at least one appliance is to be changed when said current distance is less than a pre-defined distance.

7. The method of claim 5 wherein said operational state of said at least one appliance is to be changed when said current distance is greater than a pre-defined distance.

8. The method of claim 5 further comprising automatically determining at least one of a current time-of-day, a current day-of-the-week, and a current date.

9. The method of claim 8 further comprising automatically determining a remaining time-of-travel between said current location and said known fixed location based on said current location, said known fixed location, and at least one of said current time-of-day, said current day-of-the-week, and said current date.

10. The method of claim 9 wherein said operational state of said at least one appliance is to be changed when said remaining time-of-travel is less than a pre-defined time-of-travel.

11. The method of claim 9 wherein said operational state of said at least one appliance is to be changed when said remaining time-of-travel is greater than a pre-defined time-of-travel.

12. The method of claim 8 wherein said operational state of said at least one appliance is to be changed when said current distance is less than a pre-defined distance and said current time-of-day is later than a pre-defined time of day.

13. The method of claim 8 wherein said operational state of said at least one appliance is to be changed when said current distance is greater than a pre-defined distance and said current time-of-day is later than a pre-defined time of day.

14. The method of claim 8 wherein said operational state of said at least one appliance is to be changed when said current distance is less than a pre-defined distance and said current time-of-day is earlier than a pre-defined time of day.

15. The method of claim 8 wherein said operational state of said at least one appliance is to be changed when said current distance is greater than a pre-defined distance and said current time-of-day is earlier than a pre-defined time of day.

16. The method of claim 9 wherein said operational state of said at least one appliance is to be changed when said remaining time-of-travel is less than a pre-defined time-of-travel and said current time-of-day is later than a pre-defined time of day.

17. The method of claim 9 wherein said operational state of said at least one appliance is to be changed when said remaining time-of-travel is greater than a pre-defined time-of-travel and said current time-of-day is later than a pre-defined time of day.

18. The method of claim 9 wherein said operational state of said at least one appliance is to be changed when said remaining time-of-travel is less than a pre-defined time-of-travel and said current time-of-day is earlier than a pre-defined time of day.

19. The method of claim 9 wherein said operational state of said at least one appliance is to be changed when said remaining time-of-travel is greater than a pre-defined time-of-travel and said current time-of-day is earlier than a pre-defined time of day.

20. A system for automatically changing an operational state of an appliance associated with a known fixed location, said system comprising:
means for automatically determining a common current location of two or more individuals with respect to said known fixed location;
means for providing an identity of each of the two or more individuals at the common current location;
means for automatically determining if an operational state of at least one appliance associated with said known fixed location is to be changed based on at least said common current location and the identity of each of the two or more individuals; and
means for automatically changing said operational state of said at least one appliance if said operational state is to be changed.

21. The system of claim 20 wherein said known fixed location includes one of a house, an apartment, a residential complex, an office building, a place of business, and an industrial park.

22. The system of claim 20 wherein said at least one appliance includes at least one of a lighting device, a heating system, a cooling system, a computer device, a cooking appliance, a security system, and a window covering controller, a coffee maker, a heating system of a swimming pool, a hot tub, a Jacuzzi, a fireplace, and a garage door opener.

23. The system of claim 20 wherein said step of automatically changing said operational state of said at least one appliance includes at least one of:
changing said operational state between an "ON" state and an "OFF" state,
changing said operational state between an "OPEN" state and a "CLOSED" state,
changing said operational state between an "UNBOOTED" state and a "BOOTED" state,
changing said operational state between an "ARMED" state and a "DISARMED" state,
changing said operational state between an "ACTIVATED" state and a "DE-ACTIVATED" state,
changing said operational state between "ONE PRE-PROGRAMMED" state and "ANOTHER PRE-PROGRAMMED" state,
changing said operational state between "ONE PRE-DEFINED" state and "ANOTHER PRE-DEFINED" state,
changing said operational state between a "COOKING" state and a "NON-COOKING" state, and
changing said operational state between an "ENABLED" state and a "DISABLED" state.

24. The system of claim 20 further comprising means for automatically determining a current distance between said current location and said known fixed location.

25. The system of claim 24 wherein said operational state of said at least one appliance is to be changed when said current distance is less than a pre-defined distance.

26. The system of claim 24 wherein said operational state of said at least one appliance is to be changed when said current distance is greater than a pre-defined distance.

27. The system of claim 24 further comprising means for automatically determining at least one of a current time-of-day, a current day-of-the-week, and a current date.

28. The system of claim 27 further comprising means for automatically determining a remaining time-of-travel between said current location and said known fixed location based on said current location, said known fixed location, and at least one of said current time-of-day, said current day-of-the-week, and said current date.

29. The system of claim 28 wherein said operational state of said at least one appliance is to be changed when said remaining time-of-travel is less than a pre-defined time-of-travel.

30. The system of claim 28 wherein said operational state of said at least one appliance is to be changed when said remaining time-of-travel is greater than a pre-defined time-of-travel.

31. The system of claim 27 wherein said operational state of said at least one appliance is to be changed when said current distance is less than a pre-defined distance and said current time-of-day is later than a pre-defined time of day.

32. The system of claim 27 wherein said operational state of said at least one appliance is to be changed when said current distance is greater than a pre-defined distance and said current time-of-day is later than a pre-defined time of day.

33. The system of claim 27 wherein said operational state of said at least one appliance is to be changed when said current distance is less than a pre-defined distance and said current time-of-day is earlier than a pre-defined time of day.

34. The system of claim 27 wherein said operational state of said at least one appliance is to be changed when said current distance is greater than a pre-defined distance and said current time-of-day is earlier than a pre-defined time of day.

35. The system of claim 28 wherein said operational state of said at least one appliance is to be changed when said remaining time-of-travel is less than a pre-defined time-of-travel and said current time-of-day is later than a pre-defined time of day.

36. The system of claim 28 wherein said operational state of said at least one appliance is to be changed when said remaining time-of-travel is greater than a pre-defined time-of-travel and said current time-of-day is later than a pre-defined time of day.

37. The system of claim 28 wherein said operational state of said at least one appliance is to be changed when said remaining time-of-travel is less than a pre-defined time-of-travel and said current time-of-day is earlier than a pre-defined time of day.

38. The system of claim 28 wherein said operational state of said at least one appliance is to be changed when said remaining time-of-travel is greater than a pre-defined time-of-travel and said current time-of-day is earlier than a pre-defined time of day.

39. A system for automatically changing an operational state of an appliance associated with a known fixed location, said system comprising:
  means for automatically determining a remaining time-of-travel of an individual between a current location and said known fixed location;
  means for automatically determining if an operational state of at least one appliance associated with said known fixed location is to be changed based on at least said remaining time-of-travel; and
  means for automatically changing said operational state of said at least one appliance if said operational state is to be changed.

40. The system of claim 39, wherein determination of said remaining time-of-travel is based on said current location, said known fixed location, and at least one of a current time-of-day, a current day-of-the-week, and a current date.

* * * * *